UNITED STATES PATENT OFFICE.

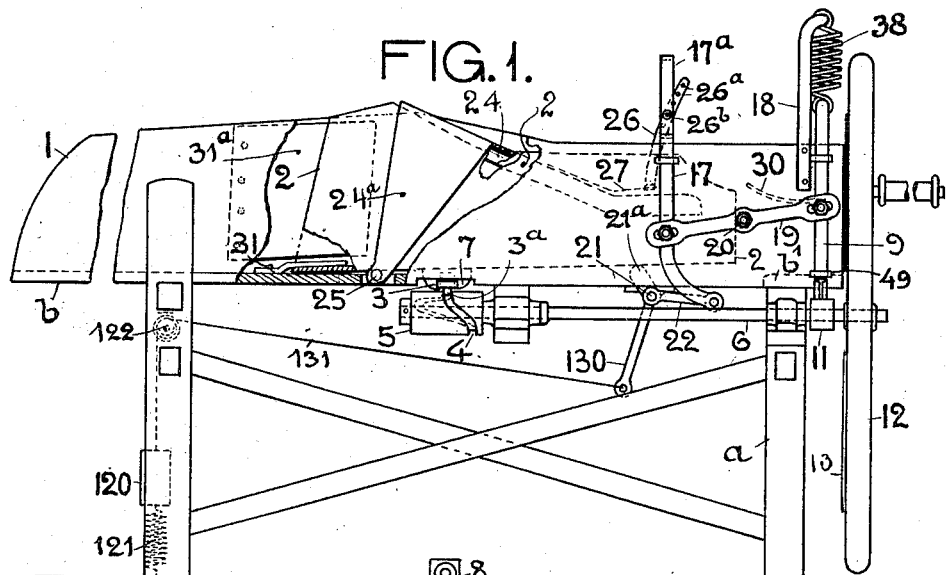

MAGNUS LARSSON, OF HELSINGBORG, SWEDEN.

FEEDER FOR STRAW AND TOBACCO CUTTERS.

1,029,759.     Specification of Letters Patent.     Patented June 18, 1912.

Application filed June 8, 1911. Serial No. 632,027.

*To all whom it may concern:*

Be it known that I, MAGNUS LARSSON, a citizen of the Kingdom of Sweden, residing in Helsingborg, Sweden, cigar-maker, have invented a new and useful Feeder for Straw and Tobacco Cutters, of which the following is a specification.

My invention relates to cutting machines for straw, tobacco and the like to be driven by hand, foot or other power and consists chiefly in an improved feeding apparatus for such machines.

The object of the invention is to provide a feeding apparatus which will afford a regular and reliable feeding of the material to and under the knives or cutters without requiring the aid of an attendant.

In the accompanying drawings: Figure 1 is a side elevation of a cutting machine equipped with this improved feeding apparatus; Fig. 2 is a plan view thereof; Fig. 3 is a front view of a modification with the knife-wheel removed; Fig. 4 is a front view of another form with the knife wheel removed; Fig. 5 is a front view of a detail.

In the embodiment illustrated in Figs. 1 and 2 a supporting stand $a$ is shown having a trough or channel 1 fixed thereto, the bottom $b$ of which is cut away for a part of its length and a small portion $b^1$ only remains at its front end. In this trough 1 is loosely mounted this improved feeder the lower jaw of which consists of a shorter trough 2 which is adapted to reciprocate longitudinally and also to move up and down at its front end, the bottom of the rear end being covered and guided by an overlapping plate 31 which is fastened at its rear edge on the bottom $b$ of the trough 1 but is otherwise free to provide a narrow space thereunder in which the rear edge of the bottom of the trough 2 can slide backward without catching the material which is fed into the trough 1 from the rear. If found necessary similar overlapping plates 31ª may be fastened on the side walls of trough 1 for the same purpose, that is to say for preventing the material from being caught by the sides of the movable trough 2 when it moves backward.

The upper jaw of the feeding apparatus consists of a plate 24, the rear end of which is pivoted to the lower jaw 2, to permit its front end to move up and down. In the drawing the plate 24 is shown provided with two downwardly directed laps 24ª one on each side preferably outside of the trough 2 to place the pivots 25 of the plate or jaw 24 at or near the bottom of trough 2. The longitudinal movement of the feeder is effected by a cylinder 5 fixed on a shaft 6 and having an endless cam groove 4 of suitable shape in which slides the end or stud 3ª of a lever 3, the other end of which is pivoted to a stationary part of the device. The lever 3 is placed beneath the trough 2 and enters a fork 7 fixed on the under side of said trough 2 to cause said trough to be reciprocated by the forward and backward movements of the lever 3, when the shaft 6 is rotated. The extent of movement of trough 2 may be varied by making the fork 7 adjustable. For that purpose the fork may be fixed on a plate 32, which is adapted to be moved along guides 34 arranged transversely of the trough and to be locked in any position in said guides by any suitable means to vary the distance between the fork 7 and the pivot 33. Or the lever 3 may have a series of holes for the pivot and a similar series of holes may be made in a stationary part 8 so that the stroke of the feeder may be changed by passing the pivot 33 in another hole.

The vertical movement of the front end of the jaw 2 is effected by short arms 21ª on a transverse shaft 21, said shaft having an arm 22 which is connected to a U-shaped bar 17, which in its turn is connected to another U-shaped or square bar 9 by means of a lever 19 fulcrumed to the trough 1 at 20, so that the bar 17 will be lifted and the jaw 2 lowered when the bar 9 is lowered and vice versa, the bars being guided by eyes 49 or any other suitable means fixed to trough 1. The transverse portion of bar 17 has an upwardly extending portion 17ª with holes for receiving a key or bolt 26ᵇ which enters a hole 26ª in a link 26 which is connected with a spring 27 fixed on the upper jaw 24, said link having a series of holes 26ª so that the distance between the front ends of jaws 2 and 24 can be changed by inserting the key 26ᵇ in another one of the holes 26ª, the spring 27 acting as a cushion for insuring a proper grasping and retaining of the material between the jaws even when the manual feeding at the rear end of trough 1 is somewhat irregular. The presser clamp 14 is connected to the bar 9 by means of bolts 47 (see Fig. 2) to cause it to partake of the vertical movement of said bar 9, a spring or springs 48 being interposed between the clamp and bar for rendering the pressure elastic, to compensate for irregular feeding. The upward movement of bar 9 is effected either by a spring 38 connected with said bar 9 and with a fixed arm or standard 18 or by a spring 121 connected with a stationary part and with an arm 130 fixed to shaft 21 or by means of a weight 120 connected to said arm 130 by a cord 131 guided by a roller 122, said spring 124 being connected with the weight 120 and shown in Fig. 1; or said movement may be effected by a combination of two or more such means thereby reliably elevating said bar 9 and should one of said means become displaced the others will still remain operative.

The downward movement of bar 9 is effected by one or more eccentrics 11 fixed on shaft 6 and adapted to engage a short horizontal arm or projection 10 on bar 9. This arm 10 may be hinged to bar 9 to adapt it to yield upward if the shaft 6 be accidentally rotated in the wrong direction, a spring $10^a$ connected to bar 9 tending to keep the arm 10 in proper position. The knife or knives 13 are fixed on the wheel 12 which is fastened on shaft 6. If it be desired that the machine make two or more cuts during each revolution of the wheel 12 two or more knives 13 and two or more eccentrics 11 are used as indicated in Fig. 5. If the bar or frame 9 is not stiff enough for securing a regular movement of the same width at both sides, this may be effected in the form shown in Fig. 3 by using two levers 15 and 16 pivoted on stationary parts and adapted to engage studs $9^a$ on both shanks of bar 9 and also engaging each other as shown in Fig. 3, said studs and also the stud 10 and other parts liable to considerable wear being preferably provided with antifriction rollers. In the form shown in Fig. 4 a straight rod 39 is substituted for the bar 9 and a bent bar 28 is fixed at one end and connected at its other end to the rod 39 supported by a stay 29, said bar 28 having a resilient portion $28^a$ which is substituted for the coil spring 38.

It is obvious that the minor details may be varied without departing from the spirit of this invention.

In the operation of the machine the material is fed manually into the rear portion of trough 1 and is caught between the jaws 2 and 24 of the feeder. The rotation of the wheel 12 rotates the shaft 6 and cylinder 5 and the lever 3 is thereby oscillated to move the feeder jaws 2 and 24 forward, the rear end of jaw 2 sliding on the bottom $b$ and the front portion sliding on the arms $21^a$. During this forward motion of the feeder the presser-clamp 14 is in its raised open position to allow the material to be fed forward between the bottom portion $b^1$ and said presser-clamp, a sloping plate 30 fixed on the lower edge of the presser clamp serving as an upper guide for the material. When the eccentric 11 strikes the arm 10 the bar 9 and presser clamp 14 are forced down so as to keep the material pressed upon the bottom portion $b^1$ while it is cut off by the knife 13. The downward motion of bar 9 is transmitted to bar 17 by the lever 19 in such a manner that this bar 17 and the jaw 24 connected therewith are lifted and the arms $21^a$ and consequently also the jaw 2 resting thereon lowered, both jaws 2 and 24 thus withdrawing from the material. It should be noted that the front end of the bottom of jaw 2 even in its foremost position does not reach the bottom portion $b^1$ and thus will be allowed to sink below the level of said bottom $b^1$ and to be fully disengaged from the material. The eccentric 11 is so long in peripheric contact with arm 10 that the bar 9 remains lowered and consequently the feeder remains open while the bar 9 is moved backward to its rear position. Then the arm 10 is released from the eccentric 11 and the bar 17 is lowered by the springs 38 or 121 or by the weight 120 whereby the feeder is closed by raising the lower jaw 2 and lowering the upper jaw 24 thus grasping the material and causing it to partake of the next advancement of the feeder, which will remain closed until the presser clamp 14 is again pressed down.

It is obvious that the form of the groove 4 on cylinder 5 must be made in accordance with the eccentrics 11 on shaft 6 so that the forward movement of the feeder will be a continuous one when using one eccentric only but be performed in two portions separated by an intermediate pause when using two eccentrics, the backward movement being in all instances performed in a single continuous stroke. In Fig. 2 the middle straight portion of the visible part of the groove in which the stud $3^a$ is just sliding, corresponds to a cut and the other visible portions which have a slope direction correspond to advancements of the feeder, a very little part of the portion corresponding to the backward movement being also visible to the left.

I claim:

In a feed cutting machine, the combination of a supporting structure, a trough fixed thereto and having the greater portion of its bottom cut away, a feeder loosely mounted in said trough and comprising a trough shaped lower jaw mounted to reciprocate in said fixed trough, means for raising and lowering the front end of said jaw, a plate secured at its rear edge to the bottom of said fixed trough with its free front end positioned to overlap the rear end of said jaw for covering and guiding it in its rearward movement, plates similarly secured to the sides of the fixed trough, and an upper jaw pivotally connected with said lower jaw.

In testimony whereof I have signed my name to this specification in the presence of two subscribing witnesses.

MAGNUS LARSSON.

Witnesses:
N. P. ANDERSON,
F. HOLMSTRÖNG.

Copies of this patent may be obtained for five cents each, by addressing the "Commissioner of Patents, Washington, D. C."